Patented July 10, 1923. 1,461,339

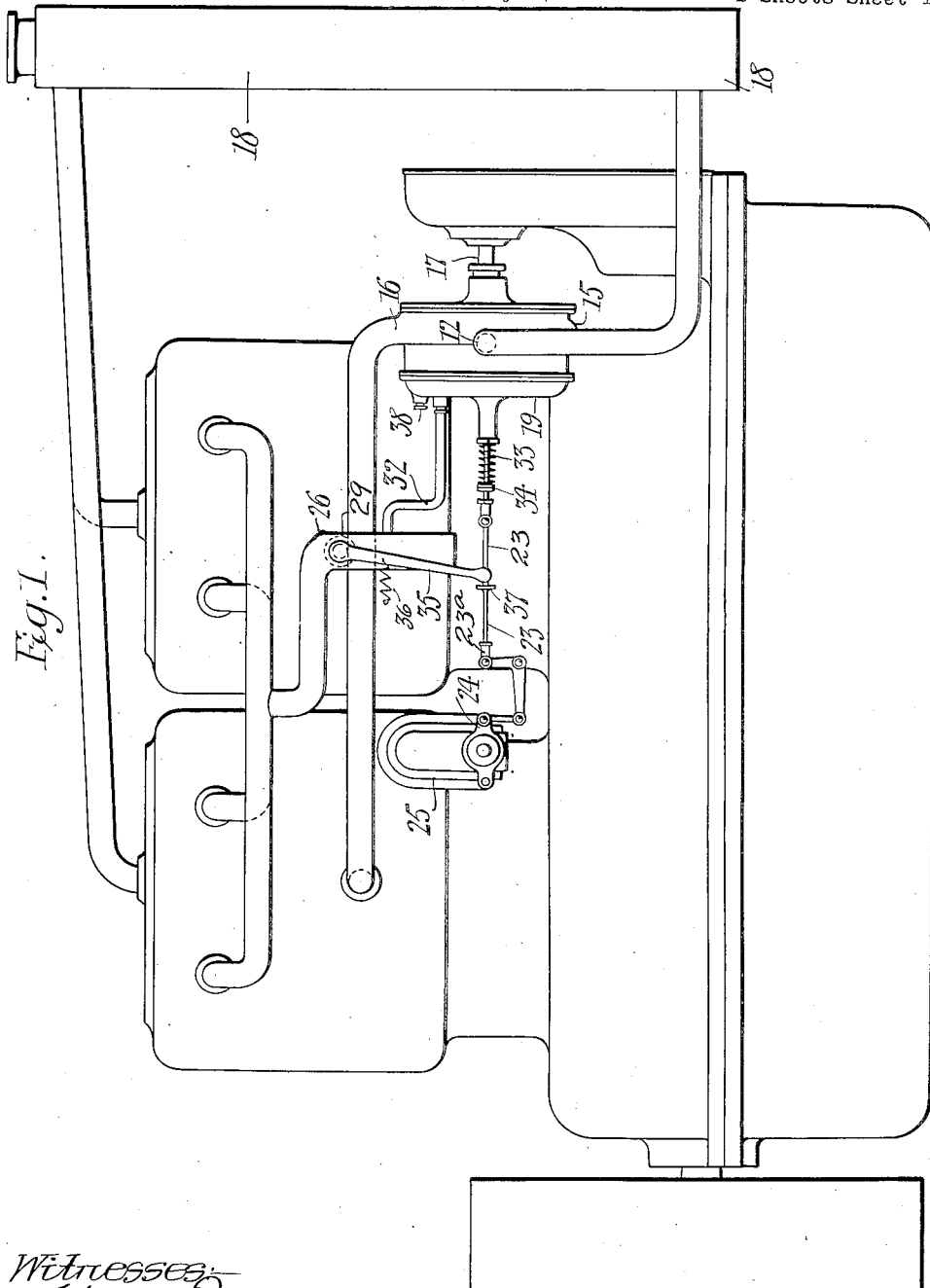

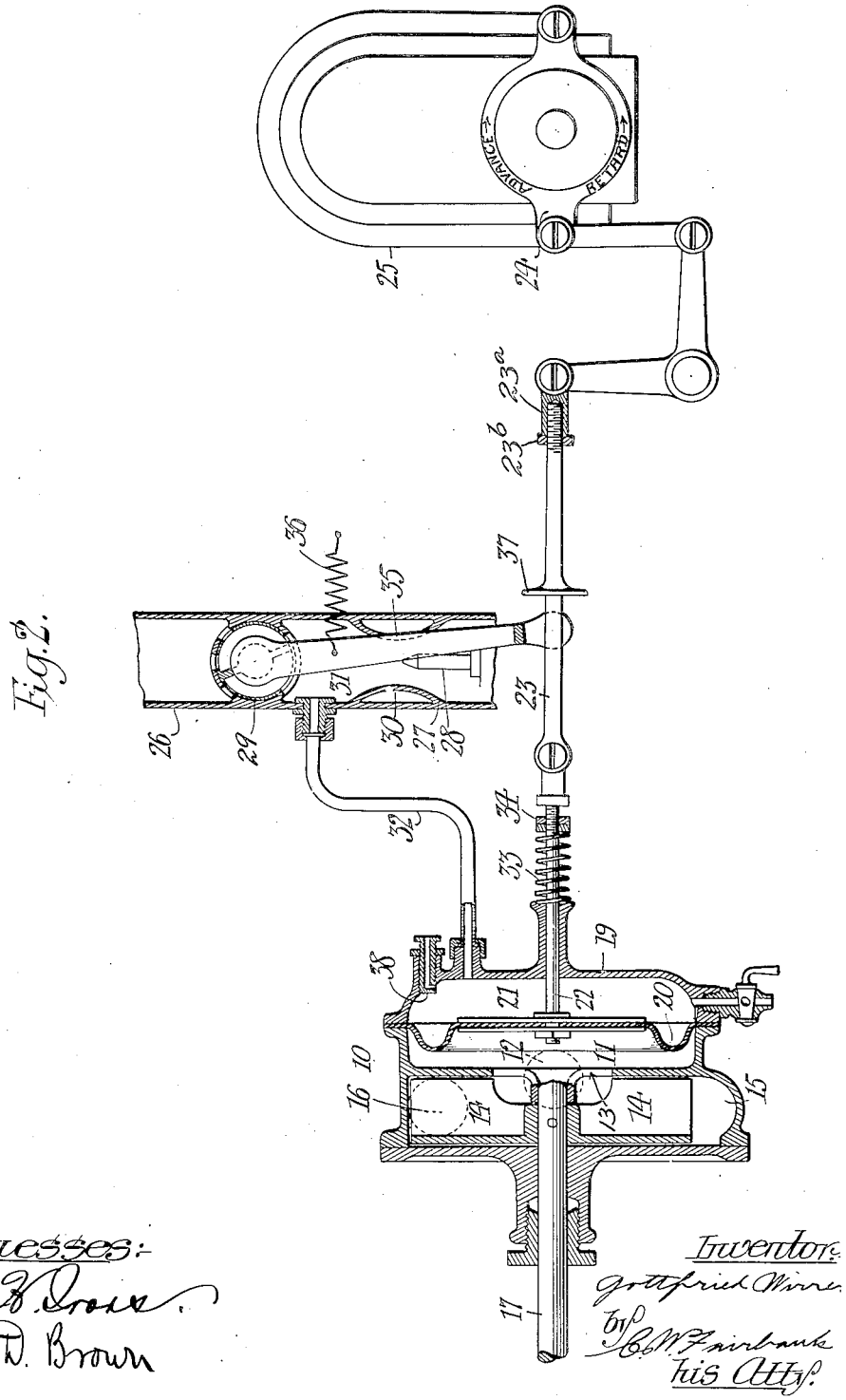

UNITED STATES PATENT OFFICE.

GOTTFRIED WIRRER, OF PLAINFIELD, NEW JERSEY, ASSIGNOR, BY MESNE ASSIGN-MENTS, TO CONNECTICUT TELEPHONE AND ELECTRIC CO., INC., OF MERIDEN, CONNECTICUT, A CORPORATION OF CONNECTICUT.

IGNITION REGULATOR FOR INTERNAL-COMBUSTION ENGINES.

Application filed May 3, 1912. Serial No. 695,803.

*To all whom it may concern:*

Be it known that I, GOTTFRIED WIRRER, a citizen of the Swiss Confederacy, and a resident of Plainfield, Union County, New Jersey, have invented certain new and useful Improvements in Ignition Regulators for Internal-Combustion Engines, of which the following is a full, clear, and exact description.

It is a well recognized fact that in an internal combustion engine, the entire explosive charge is not instantaneously ignited, but that it actually requires a period of time to secure the complete ignition of each charge. In order to operate an engine of this type at its highest efficiency, the spark which ignites the charge should occur in advance of the moment when the piston reaches the top of its compression stroke, the degree of advance being sufficient to permit the entire charge to be fully ignited at the moment the piston reaches the top of its compression stroke whereby the force of the expanding gas will at that moment begin to exert its power on the piston. The nearer it is possible to bring about this condition, the more efficient will the operation be. Manifestly, if the spark is too far advanced it will cause the engine to knock by offering undue resistance to the movement of the piston on the last part of its compression stroke. On the other hand, if the spark occurs too late the full force of the expanding gas will not exert itself on the piston at the beginning of the power stroke, and indeed will be late throughout the entire power stroke. The greater the speed of the engine the earlier may the ignition take place without interfering with the normal operation. The speed of flame propagation varies with the character of fuel, richness of mixture, degree of compression, temperature, and other factors of more or less importance not necessary to enumerate here. Certain of these factors may be substantially constant for a given engine or a given run, as for example, the character of fuel, but a very important variable factor is the mass of the charge. The rate of flame propagation varies with the degree of compression of the charge and in a given engine the degree of compression varies with the mass of the charge admitted to be compressed. Thus, the rate of flame propagation varies with the mass of the charge admitted. The admission of a larger charge permits the engine to carry the same load at a higher speed, or a greater load at the same speed, while a reduction in charge reduces speed for a given load or requires a reduction in load to maintain the same speed. From this, it follows that the horsepower obtained from an engine is varied by varying the mass of the charge. While the engine is running at a constant speed, it is evident that the proper time for the formation of the spark should vary with the mass of the charge. In the event of an increase in load or an increase in the charge, the spark should be retarded in accordance therewith. It follows that to attain the highest efficiency the time of the spark should be varied automatically in accordance with the speed and the load. Heretofore, the timing of the spark has been controlled by hand alone, or by a speed governor the operation of which depended wholly upon variations in speed. By my invention, I so control the ignition of the charge that the maximum power is obtained from the fuel and I do this by varying the moment of the spark and the initial ignition of the charge in accordance with variations in speed and particularly in accordance with variations in load. I not only automatically advance the spark as the speed increases and retard it as the speed decreases, but I also advance it as the size of the charge decreases with a decreasing load, and also retard it when an increased charge is used for an increasing load.

Various mechanical devices may be designed for carrying out my invention, but I preferably regulate the time of the spark by the movement of a controlling member constantly subjected to two independent influences, one of which varies as the speed of the engine and the other of which varies as the mass of the charge. An increase in the engine speed increases the tendency of said member to move in one direction and advance the spark, while an opening of the throttle to increase the mass of the charge to take care of a heavier load increases the tendency of said member to move in the opposite direction and retard the spark. These two influences are coordinated in such a way as to cause the spark to occur at as near as possible the correct time.

My invention is particularly useful in connection with internal combustion motors which are subjected to wide variations in speed and load, such for example, as used on motor vehicles. Assume, for instance, a motor vehicle traveling upon level ground. If a hill is reached and it is desired to maintain the same speed, the throttle will be opened and the engine load will be relatively increased. Under such conditions my improved device will act to retard the spark to the desired degree to prevent "pounding" or "back firing" and the stalling of the engine. If the throttle were not opened on ascending such a hill, the motor would necessarily slow down by reason of the increased load. This condition will also result in an automatic retardation of the spark to the proper degree, otherwise "pounding" or "back firing" would occur.

The character of the controlling member may be varied as well as the character of the mechanisms which subject that member to separate influences. For instance, the member may be in the form of a diaphragm, subject to variable fluid pressures on opposite sides. In such an event one fluid pressure may be varied in accordance with the speed of the engine and may be created by the oil pump, the water pump, or the cooling fan of the engine, or a special fluid pressure creating means operated by the engine, while the other fluid pressure may be a suction pressure in the gas supply pipe leading to the engine. A ball governor mechanically connected to the diaphragm might be used in place of the first mentioned fluid pressure.

One important feature of my invention is dependent upon the discovery that the aforesaid suction pressure varies directly with the load on the engine for any given speed. In the drawings, I have conventionally shown a carburetter of the vaporizer type in which the fuel jet or nozzle stands in a contracted passage or venturi at the lower end of the gas pipe or manifold 26. This pipe has therein a suitable throttle valve 29 to control communication between the carburetter and the engine, and to vary the amount of gas delivered to the latter.

When the engine is running, a suction is created in the pipe 26 all the way from the venturi to the cylinders. This suction varies in accordance with the load on the engine and is utilized by me in automatically controlling the spark. In the particular form of my invention shown, I operate with the suction pressure that exists between the carburetter and the throttle valve which pressure varies with the load on the engine and obviously with any change in the degree of opening of the throttle in said pipe.

In putting my invention into practice, I preferably employ a diaphragm as above stated. The force tending to move the diaphragm in one direction, varies directly as the speed of the engine and is produced by a suitable form of speed governor which may be a ball governor or a liquid pressure created by a pump in gear with the engine, whereas the force which tends to move the diaphragm in the opposite direction varies directly as the load on the engine, and is created by the suction in the inlet pipe which supplies gas to the cylinder. This means may be so controlled that the resultant of the two forces will always cause spark to occur at the theoretically correct point in the cycle.

In the accompanying drawings, I have shown my invention in only one preferred form, and many of the parts associated therewith which are well understood I have shown only conventionally.

In said drawings:

Fig. 1 is illustrative of one side of an engine with my improved controlling means shown in place.

Fig. 2 is a side elevation relatively enlarged of certain parts shown in section.

It is of course to be understood that my invention may be employed in connection with any type of internal combustion engine equipped with any type of sparking device for igniting the charge. In the drawings I have illustrated conventionally a four-cylinder engine equipped with a magneto 25 as the spark generating means. I have not shown the various leads from the magneto to the various cylinders, as the same are well known.

10 represents a water pump having a chamber 11 and an inlet 12 which delivers water to the pump through a port 13 in a partition that partially separates the chamber 11 from the chamber containing the pump blades 14. The pump is geared to the engine and the rapidly revolving blades 14 throw the water out into a peripheral channel 15 from which it is discharged through an outlet 16 which leads to the water jacketed portion of the engine and thence to a radiator 18 from whence it is conducted by a return pipe to the pump 10. 17 represents the driving shaft for the pump and this, being geared to the engine, varies directly with the speed thereof. The casing of the pump has an outer removable plate 19 which serves to hold and cover a flexible diaphragm 20, there being a chamber 21 between the plate 19 and said diaphragm. The action of the pump tends to draw liquid from the chamber 11 and this tends to move the diaphragm 20 toward the pump in accordance with the speed of the latter. 22 is a rod which is connected at its inner end to the diaphragm and passes out through the wall 19, the latter being provided with a suitable extension forming a bearing for the rod 22 in which the latter may slide. Adjustably connected to the threaded outer end of the rod 22 is a link 23 which is suitably connected with a lever arm 24 on the timer portion of a magneto 25. The movement of this timer arm 24 in one direction or the other advances or retards the spark. In the particular form shown, when the timer arm 24 is moved upwardly the spark is advanced, and when it is moved downwardly the spark is retarded. In the drawings, Fig. 2, I have conventionally shown a bell crank system of linkage between the timer arm 24 and the link 23. Any suitable means may be provided for effecting the manual control or adjustment of the timer arm 24. In this particular instance, the manual adjusting means comprises an end piece 23$^a$ which is screw threaded on the end of the link 23 so that by manually moving this part in or out on the link 23, said connection may be lengthened or shortened at will and the angular adjustment of the timer may be manually controlled. 23$^b$ is a check nut which may be provided to lock the parts together after manual adjustment, when it is desired to do so.

In the particular form shown, the carburetter is illustrated in the simplest possible manner. The charge is delivered to the engine by an intake pipe 26, at the lower end of which is located the carburetter 27. Fuel is admitted through a nozzle 28 which is located in a restricted passage or venturi 30 which functions in the usual manner to draw liquid fuel from the nozzle. Between the carburetter and the engine is located a throttle valve 29. Between the throttle valve 29 and the carburetter is a chamber 31. 32 is an air pipe which connects the chamber 31 with the chamber 21 between the diaphragm 20 and the end wall 19 of the pump housing. Obviously, as a suction pressure is created within the chamber 31 a corresponding suction pressure is caused to occur in the chamber 21, and this tends to draw the diaphragm to the right as viewed in Fig. 2 and in opposition to the tendency of the speed governor. With the throttle 29 nearly closed for very lght loads the suction pressure in the chambers 31 and 21 will be correspondingly slight. With the throttle 29 wide open for heavy loads, there will be a correspondingly greater suction pressure in the chambers 31 and 21, the effect of which will be to draw the diaphragm 20 to the right and retard the spark. It will be noted that the diaphragm is subjected to these opposing forces and that the position which the diaphragm assumes at any particular instant is determined by the mean between these forces. Either force may be aided by a spring, weight, or other auxiliary means, and in the form shown in the drawings, I have illustrated a spring 33 as such auxiliary means. This spring 33 is located between the outer end of the cover 19 and an adjustable abutment 34 in the form of a nut threaded on the rod 22 and by which the operative tension of the spring 33 may be modified, as desired. When the engine is at rest, this spring 33 aided by the weight of water in the chamber 11 will retard the spark and prevent the possibility of back firing when the engine is started. To prevent too great suction pressure in the chamber 21, I may provide an adjustable air vent which is conventionally indicated at 38 and is in the form of a screw plug so constructed that by rotating the plug in one direction or the other, the vent may be opened or closed to any desired degree. The chamber 21 may have a drain cock for permitting the escape of water of condensation. I may also provide means for preventing the engine from racing under light loads. To this end the throttle valve may have, in addition to the usual manually controlled lever therefor (not shown), another lever 35, which may be so associated with a stop shoulder 37 on the rod 23 that should the engine acquire excessive speed or race, the diaphragm 20 will move the rod 23 to such an extent to the left as to engage the lever 35 and sufficiently close the throttle to prevent racing. A spring 36 may be provided to hold the lever arm 35 in a desired position ready to operate whenever the engine begins to race.

Among other things, I have not attempted to show many of the various hand controls such as are commonly used with automobile engines, since the same would only unnecessarily complicate the drawings and the description and further, since the same are all well understood.

From the foregoing it is apparent that the operative angle of the timer arm 24 by which the ignition is advanced or retarded, is controllable by three different means, to wit, a means which is controlled by the speed of the engine, a means which is controlled by the load on the engine, and a means which is controlled by hand.

It will also be noted that the adjustable venting device 38 operates in effect as a damping means to modify the speed of action of the diaphragm 20.

Having thus described my invention, what I claim as new and desire to secure by Letters Patent is:

1. In an internal combustion engine, means for timing the ignition comprising a movable member subjected to a fluid pressure determined by the combined effect of the speed of the engine and the load thereon.

2. In an internal combustion engine, means for timing the ignition comprising a movable member subjected on one side to a fluid pressure which varies with the speed of the engine and on the other side to a fluid pressure which varies with the load on the engine.

3. In an internal combustion engine, means for timing the ignition comprising a movable member subjected to independent forces derived respectively from the speed of the engine and from a suction developed by the admission of the charge.

4. In an internal combustion engine, means for timing the ignition comprising a movable member subjected to independent forces derived respectively from the speed of the engine and from the suction in the gas inlet pipe.

5. In an internal combustion engine, means for timing the ignition comprising a movable member subjected to a fluid pressure dependent on the speed of the engine, and means for varying the effective result of said pressure in accordance with a suction derived from the admission of the charge.

6. In an internal combustion engine, means for timing the ignition comprising a movable member subjected to a fluid pressure dependent on the speed of the engine, and means for varying the effective result of said pressure in accordance with the suction in the gas inlet pipe.

7. In an internal combustion engine, means for timing the ignition comprising a liquid circulating system including a pump, a pressure-operated member movable in accordance with variations in the speed of the pump, and means for subjecting said movable member to a suction developed by the admission of the charge.

8. In an internal combustion engine, the combination of a flexible diaphragm, means for subjecting the diaphragm to a suction developed in the gas inlet pipe, and means connected to the diaphragm for varying the timing of the ignition.

9. In an internal combustion engine, the combination of a centrifugal pump, a flexible diaphragm subjected on one side to the suction developed by said pump, means for subjecting the opposite side of the diaphragm to the suction in the gas inlet passage, and means for timing the ignition in accordance with the position of the diaphragm.

10. In an internal combustion engine, the combination of a throttle, ignition means, means for automatically timing the ignition, and means actuated by the timing mechanism for closing the throttle under abnormally high engine speeds to prevent racing of the engine under light load.

11. In an internal combustion engine, the combination with ignition mechanism of means for adjusting it in accordance with the speed of the engine, and cooperatng means automatically controlled by the load on the engine for adjusting the ignition mechanism in accordance with said load.

12. In an internal combustion engine, the combination with ignition mechanism of means for adjusting it in accordance with the speed of the engine, and cooperating means controlled by suction in the fuel passage for adjusting the ignition mechanism in accordance with the load on the engine.

13. In an internal combustion engine, the combination with an ignition timer of means for operating it comprising a movable member subjected to a suction developed by the admission of the charge to the engine.

14. In an internal combustion engine, in combination, means for timing the ignition comprising a movable member subjected to a fluid pressure determined by the combined effect of the speed of the engine and the load thereon, and a spring constantly tending to retard the ignition.

15. In an internal combustion engine, the combination with an ignition timer of means for operating it comprising a movable member subjected to a suction which varies with the position of the throttle.

16. In an internal combustion engine, the combination with an ignition timer of means for operating it comprising a movable member subjected to a suction which varies with the position of the throttle and to an independent force which varies with the speed of the engine.

17. In an internal combustion engine, the combination with ignition mechanism which is adjustable to vary the timing of the ignition, of means for effecting the adjustment of the same by the action of forces derived from the operation of the engine and tending respectively to retard the ignition as the load thereon increases and to advance the ignition as the speed increases.

18. In an internal combustion engine, the combination with ignition mechanism which is adjustable to vary the timing of the ignition, of means controlled by the speed of the engine and tending to advance the ignition as the speed increases, and means tending to retard the ignition as the load thereon increases and comprising a movable member subject to a fluid pressure which varies with the position of the throttle.

19. In an internal combustion engine, the combination with ignition mechanism which is adjustable to vary the timing of the ignition, of means controlled by the speed of the engine and tending to advance the ignition as the speed increases and means tending to retard the ignition as the power demand increases and comprising a movable member subject to a suction developed by the admission of the explosive mixture to the engine.

20. In an internal combustion engine, the combination with an ignition timer, of means for operating the same to advance or retard the spark comprising a movable member moved by differences in degree of suction occurring in the gas inlet passage of said engine.

21. In an internal combustion engine, the combination with an ignition timer, of means for operating the same to advance or retard the spark comprising a movable member controlled by differences in degree of suction occurring in the gas inlet passage of said engine, and tending to advance the spark upon a decreasing of the load on the engine and to retard the spark upon an increasing of load on the engine.

22. An ignition controller including the combination with an internal combustion engine, of ignition timing means, timer controlling means actuated by the vacuum in the intake pipe of said engine, and a second timer controlling means actuated by the speed of the engine whereby the time of ignition is determined jointly by the speed of said engine and the vacuum in the intake pipe of said engine.

23. An ignition controller including the combination with an internal combustion engine, of ignition timing means, timer controlling means actuated by a difference in pressure which is dependent on the amount of mixture which is supplied to said engine, whereby the ignition is advanced as the amount of said mixture is decreased, and a second timer controlling means actuated by the speed of said engine, whereby the amount of advance produced by the first named timer controlling means is augmented by an amount which is greater as the speed of the engine is increased.

24. In an ignition controller for internal combustion engines an ignition timing device, means for manually adjusting the same, and means controllable by variations in the load on the motor for modifying the action of said timing device in its various positions of manual adjustment and independent of any change in speed of the motor.

25. In a device of the class described, the combination with centrifugally controlled spark timing mechanism for a gasoline engine, of means operating automatically and co-acting therewith to effect proper adjustment of the timer mechanism according to power requirements on the engine.

26. In a device of the class described, the combination with automatically controlled centrifugally operating spark timing mechanism, of means co-acting therewith and operating automatically to change the adjustment of the timer mechanism according to power requirements imposed upon the engine.

27. In a device of the class described, the combination with an engine, a shiftable mechanism forming a part thereof, a fuel inlet, and centrifugally operating means connected to said engine to operate with changes in speed of the engine, of a device communicating with said fuel inlet and mechanically connected to operate in cooperative relation with said centrifugally operating means according to conditions of changing pressure and flow within the fuel inlet to shift said mechanism.

28. In a device of the class described, the combination with an engine, a fuel inlet therefor, and means controlling the flow through said inlet to the engine, of an auxiliary mechanism adjustable to different positions to control the operation of the engine for different conditions, means communicating with said inlet and susceptible to changes of conditions therein for operation thereby, centrifugally operating mechanism driven by the engine and co-acting with said means, and operative connections between said means, said centrifugally operating mechanism and said auxiliary adjustable mechanism.

29. An internal combustion engine having an igniter, means for automatically varying the time of ignition in accordance with the speed of the engine, and means for automatically varying the time of ignition by and in accordance with the suction pressure in the carburetor.

30. In a device of the class described, the combination with centrifugally controlled spark timing mechanism for a gasoline engine, of means operating automatically and co-acting therewith to effect proper adjustment of the timing mechanism according to power requirements on the engine.

31. In a device of the class described, the combination with automatically controlled centrifugally operating spark timing mechanism, of means co-acting therewith and operating automatically to change the adjustment of the timing mechanism according to power requirements imposed upon the engine.

32. In a device of the class described, the combination with an engine, a shiftable mechanism forming part thereof, a fuel inlet, and centrifugally operating means connected to said engine to operate with changes in speed of the engine, of a device communicating with said fuel inlet and mechanically connected to operate in cooperative relation with said centrifugally operated means according to conditions of changing pressure and flow within the fuel inlet to shift said mechanism.

33. In a device of the class described, the combination with an engine, a fuel inlet therefor, and means controlling the flow through said inlet to the engine, of an auxiliary mechanism adjustable to different positions to control the operation of the engine for different conditions, means communicating with said inlet and susceptible to changes of conditions therein for operation thereby, centrifugally operating mechanism driven by the engine and co-acting with said means, and operative connections between said means, said centrifugally operating mechanism, and said auxiliary adjustable mechanism.

34. In a device of the class described, the combination with an engine, a fuel inlet therefor, and means controlling the flow through said inlet to the engine, of means communicating with said inlet and susceptible to changes of conditions therein for operation thereby, centrifugally operating mechanism driven by the engine and co-acting with said means, and a device connected therewith operated by said co-acting means and mechanism.

35. In an internal combustion engine, the combination with ignition mechanism which is adjustable to vary the timing of the ignition of means for effecting the adjustment of the same by the action of forces derived from the operation of the engine and tending respectively to retard the ignition as the power demand increases and to advance the ignition as the speed increases.

36. In an internal combustion engine, the combination with ignition mechanism which is adjustable to vary the timing of the ignition, of means controlled by the speed of the engine and tending to advance the ignition as the speed increases, and means tending to retard the ignition as the power demand increases and comprising a movable member subject to a fluid pressure which varies with the position of the throttle.

37. In an internal combustion engine, the combination with ignition mechanism which is adjustable to vary the timing of the ignition, of means controlled by the speed of the engine and tending to advance the ignition as the speed increases, and means tending to retard ignition as the power demand increases and comprising a movable member subject to a suction developed by the admission of an explosive mixture to the engine.

38. In a combined throttle and spark control for internal combustion motors, a spark timing device, means for manually adjusting the same, and means controllable by variations in the load on the motor for modifying the action of said timing device in its various positions of manual adjustment and independent of any change in the speed of the motor.

39. An ignition controller for internal combustion engines comprising ignition timing means actuated by the vacuum set up by the flow of combustible mixture to the engine, and a vent for modifying the effect of said suction on said ignition timing means.

40. An ignition controller for internal combustion engines comprising ignition timing means actuated by the vacuum set up by the flow of combustible mixture to the engine, and a vent for modifying the effect of said suction on said ignition timing means, and a valve for said vent.

41. An ignition controlling means for internal combustion engines comprising a movable member arranged to cooperate with an ignition timer to move the same, a housing at one side of said movable member with means for connecting the interior of said housing with the intake pipe of an internal combustion engine for creating suction pressure within said housing and a vent for modifying said suction pressure.

42. An ignition controlling means for internal combustion engines comprising a movable member arranged to cooperate with an ignition timer to move the same, a housing at one side of said movable member with means for connecting the interior of said housing with the intake pipe of an internal combustion engine for creating suction pressure within said housing, a vent for modifying said suction pressure, and a valve for controlling the effective size of said vent.

43. An ignition controller for internal combustion engines comprising, an ignition timing means, pneumatic means actuated by intake suction and cooperating with said ignition timing means, said pneumatic means having a vent with means for controlling said vent for modifying the effective operation of said intake suction on said pneumatic means.

In testimony whereof I have signed my name to this specification in the presence of two subscribing witnesses.

GOTTFRIED WIRRER.

Witnesses:
HENRY S. OTTO,
C. W. FAIRBANK.